(12) United States Patent
Filali-Adib et al.

(10) Patent No.: US 8,448,169 B2
(45) Date of Patent: May 21, 2013

(54) MANAGING UNIQUE ELECTRONIC IDENTIFICATION FOR KERNEL EXTENSIONS IN ISOLATED VIRTUAL SPACE

(75) Inventors: Khalid Filali-Adib, Austin, TX (US); Kevin L. Fought, Round Rock, TX (US); David W. Sheffield, Austin, TX (US); Nathaniel S. Tomsic, Austin, TX (US); Sungjin Yook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/834,483

(22) Filed: Jul. 12, 2010

(65) Prior Publication Data
US 2012/0011502 A1    Jan. 12, 2012

(51) Int. Cl.
G06F 9/455    (2006.01)
G06F 9/00     (2006.01)
H04L 29/06    (2006.01)

(52) U.S. Cl.
USPC ............... 718/1; 713/2; 713/164; 707/698

(58) Field of Classification Search
USPC .................... 707/698; 713/2, 164; 718/1
See application file for complete search history.

(56) References Cited

U.S. PATENT DOCUMENTS

| | | | |
|---|---|---|---|
| 6,308,184 B1 | 10/2001 | Hewitt | |
| 6,385,567 B1 | 5/2002 | Lew et al. | |
| 6,397,331 B1 * | 5/2002 | Ober et al. | 713/164 |
| 6,658,416 B1 | 12/2003 | Hussain et al. | |
| 6,678,883 B1 | 1/2004 | Berry et al. | |
| 6,681,216 B2 | 1/2004 | Hewitt | |
| 6,708,169 B1 | 3/2004 | Berry et al. | |
| 6,728,949 B1 | 4/2004 | Bryant et al. | |
| 6,766,511 B1 | 7/2004 | Berry et al. | |
| 6,988,263 B1 | 1/2006 | Hussain et al. | |

(Continued)

OTHER PUBLICATIONS

U.S. Appl. No. 12/834,479, filed Jul. 12, 2010, Filali-Adib, Khalid et al.

(Continued)

*Primary Examiner* — Charles E Anya
(74) *Attorney, Agent, or Firm* — DeLizio Gilliam, PLLC

(57) ABSTRACT

Some embodiments of the inventive subject matter are directed to detecting a file that a first instance of an operating system is configured to load where the file is configured to extend functionality of a kernel when loaded. In some embodiments, the first instance of the operating system is managed by a second instance of the operating system (e.g., the first instance of the operating system is a virtual operating system and the second instance is a global operating system). The first and second instances of the operating system share the kernel. Some embodiments are further directed to generating a unique electronic identifier based on properties of the file. The unique electronic identifier uniquely identifies the file. Some embodiments are further directed to providing a copy of the file to the first instance of the operating system, and some time later, receiving a request from the first instances of the operating system to load the copy of the file. Some embodiments are further directed to determining, using the unique electronic identifier, that the copy of the file from the first instance of the operating system is equivalent to the file. Some embodiments are further directed to loading the copy of the file in response to determining, using the unique electronic identifier, that the copy of the file is equivalent to the file. The loading extends the functionality of the kernel.

20 Claims, 6 Drawing Sheets

U.S. PATENT DOCUMENTS

| | | | |
|---|---|---|---|
| 7,356,808 | B2 | 4/2008 | Bonsteel et al. |
| 7,458,078 | B2 | 11/2008 | DeWitt, Jr. et al. |
| 7,496,757 | B2 | 2/2009 | Abbott et al. |
| 7,865,914 | B2 | 1/2011 | Jung et al. |
| 8,060,715 | B2 * | 11/2011 | Cremelie et al. ............... 711/162 |
| 8,161,012 | B1 * | 4/2012 | Gerraty et al. ................. 707/687 |
| 2002/0066016 | A1 * | 5/2002 | Riordan ........................ 713/170 |
| 2002/0111995 | A1 | 8/2002 | Mansour et al. |
| 2002/0143842 | A1 | 10/2002 | Cota-Robles et al. |
| 2005/0102673 | A1 | 5/2005 | DeWitt, Jr. et al. |
| 2006/0064683 | A1 | 3/2006 | Bonsteel et al. |
| 2008/0028124 | A1 | 1/2008 | Tago |
| 2008/0155516 | A1 | 6/2008 | Bonsteel et al. |
| 2008/0301440 | A1 | 12/2008 | Plouffe, Jr. et al. |
| 2009/0089579 | A1 * | 4/2009 | Murase et al. ................. 713/164 |
| 2010/0199104 | A1 * | 8/2010 | Van Rijnswou ............. 713/189 |
| 2010/0223613 | A1 * | 9/2010 | Schneider ........................ 718/1 |
| 2010/0228913 | A1 | 9/2010 | Czezatke et al. |
| 2012/0011503 | A1 | 1/2012 | Filali-Adib et al. |

OTHER PUBLICATIONS

U.S. Appl. No. 12/834,492, filed Jul. 12, 2010, Filali-Adib, Khalid et al.

Mullen, Shawn et al., "AIX Solutions For Security and Compliance: The Payment Card Industry Data Security is a guide to effective security policy", *IBM Systems Magazine* http://www.ibmsystemsmag.com/print/print.aspx?print_page=%2Faix%2Faugustseptember08%2Fcoverstory%2F21121printp1.aspx&string_referer =/aix/augustseptember08/coverstory/21121p4.aspx (Obtained from the Internet on Jul. 9, 2010) Aug./Sep. 2008, 6 pages.

Tamches, Ariel et al., "Fine-Grained Dynamic Instrumentation of Commodity Operating System Kernels", *Computer Sciences Department*, Univeristy of Wisconsin Madison, WI 53706-1685 http://www.usenix.org/events/osdi99/full_papers/tamches/tamches.pdf (Obtained from the Internet on Jul. 8, 2010) Feb. 1999, 15 pages.

"U.S. Appl. No. 12/834,479 Office Action", Jul. 19, 2012, 48 pages.

"U.S. Appl. No. 12/834,492 Office Action", Jul. 25, 2012, 24 pages.

* cited by examiner

MANAGING UNIQUE ELECTRONIC IDENTIFICATION FOR KERNEL EXTENSIONS IN ISOLATED VIRTUAL SPACE

BACKGROUND

Embodiments of the inventive subject matter generally relate to the field of virtual operating systems, and, more particularly, to securely managing kernel extensions in virtual operating systems.

Operating system virtualization is a technology that can divide a single host, such as a server, into multiple parts, or partitions, each running a separate instance, or image, of an operating system (OS). The instances of the operating systems are separate, or isolated, from each other in some ways. For example, the instances of the operating systems have separate file systems, separate users, separate applications, and separate processes. In other ways, however, the instances of the operating systems are not separate and can share some resources of the host. For example, the instances of the operating systems can share the memory, the kernel, the processors, the network cards, the hard drives, and/or other software, firmware, and/or hardware of the host. Thus, each instance of the operating system can look and feel like a separate server or machine from the point of view of its users. However, because the instances of the operating system share resources of the host, the instances of the operating systems are not actually separate devices. The instances of the operating system are commonly referred to as "virtual" or "virtualized" operating systems (virtual OS's). In similar contexts, virtualized operating systems are also referred to as virtual partitions, virtual machines, virtual environments, or virtual servers.

Virtual OS's can be implemented in different ways. One way is for an administrative user to create a logical partition (LPAR) on a host and install an instance of an operating system on the LPAR. The administrative user can create a logical partition (LPAR) by dividing a portion, or subset, of the host's hardware resources, such as processors, memory, and storage. The administrative user can isolate the LPAR from other LPARs running on the same device or machine. Specifically, the administrative user isolates the subset of the host's hardware resources from other subsets, so that multiple LPARs can run on the host, with each LPAR operating independently of each other, as if each LPAR was a separate machine. The administrative user can install an instance of the operating system on an LPAR. The instance of the operating system can run its own applications in a way that is separate and isolated from any other LPAR. The number of LPARs that can be created on a host, however, depends on the number of the host's resources available. For example, to create an LPAR, an administrative user must physically partition a portion of the host's memory and assign the portion of the host's memory to the LPAR. Because LPARs have separation at the hardware level, LPARs are very stable, can run different versions of an operating system, and provide a very high degree of isolation from other LPARs.

A different way to create a virtual OS is to form a workload partition (WPAR). WPARs were introduced in the IBM® AIX® 6.1 operating system. WPARs are a software implementation of operating system virtualization. More specifically, WPARs are software partitions that are created from, run under, and share the resources of a managing instance of the operating system (OS). The WPARs and the managing instance share an identical operating system (e.g., identical version, identical patches, identical tuning options, etc.). The managing instance of the OS may be referred to as a global environment or a global OS. Multiple WPARs can run on a single managing resource (e.g., on a single machine or on a single LPAR), which can all be managed by the global OS. An administrative user does not need to physically divide up portions of the host's hardware to create a WPAR. Rather, the administrative user runs a command to generate a WPAR and the global OS creates and manages the WPAR as a software partition. Because WPARs are software implementations, WPARs can easily be migrated from one managing resource to another (e.g., from one LPAR to another or from one machine to another).

WPARs can be two types, a system WPAR and an application WPAR. System WPARS are virtual system environments that have their own separate file systems, users and groups, login, network space, and administrative domain. All system WPARs managed by the global OS share the same kernel, the same memory, and some other resources that the global OS uses. Application WPARs are lightweight environments used for isolating and executing one or many application processes.

SUMMARY

Some embodiments are directed to detecting a file that a first of a plurality of instances of the operating system is configured to load. In some embodiments, the kernel and the plurality of instances of the operating system are managed by a second of the plurality of the instances of the operating system, the plurality of the instances of the operating system share a kernel, and the file is configured to extend functionality of the kernel when loaded. Some embodiments are further directed to generating a unique electronic identifier based on properties of the file. The unique electronic identifier uniquely identifies the file. Some embodiments are further directed to providing a copy of the file to the first of the plurality of instances of the operating system. Some embodiments are further directed to receiving a request from the first of the plurality of the instances of the operating system to load the copy of the file and determining, using the unique electronic identifier, that the copy of the file from the first of the plurality of the instances of the operating system is equivalent to the file. Some embodiments are further directed to loading the copy of the file in response to determining, using the unique electronic identifier, that the copy of the file is equivalent to the file. The loading extends the functionality of the kernel. Some embodiments may include a method, a computer program product for managing kernel extensions for one or more virtual operating systems, a computer program product having a computer readable storage medium, a computer readable storage medium having computer readable program code, combinations thereof, etc.

Some embodiments are directed to an apparatus with a processing unit, a network interface, and a virtual operating system manager. In some embodiments, the virtual operating system manager is operable to, via the processing unit, detect a file that a first of a plurality of instances of the operating system is configured to load. A kernel and the plurality of instances of the operating system can be managed by a second of the plurality of the instances of the operating system. The plurality of the instances of the operating system can share the kernel. The file can be configured to extend functionality of the kernel when loaded. In some embodiments, the virtual operating system manager is further operable to perform a hash function procedure on one or more unique properties of the file using a hash algorithm, and generate a hash value via the hash function procedure. The hash value uniquely identifies the one or more unique properties of the file. In some embodiments, the virtual operating system manager is further operable to store the hash value in memory accessible only to the second of the plurality of the instances of the operating system, and provide a copy of the file to the first of the plurality of instances of the operating system after generating the hash value. In some embodiments, the virtual operating system manager is further operable to receive a request from the first of the plurality of the instances of the operating system to load the copy of the file, access the hash value, and use the hash value to verify that the copy of the file possesses the one or more unique properties of the file.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
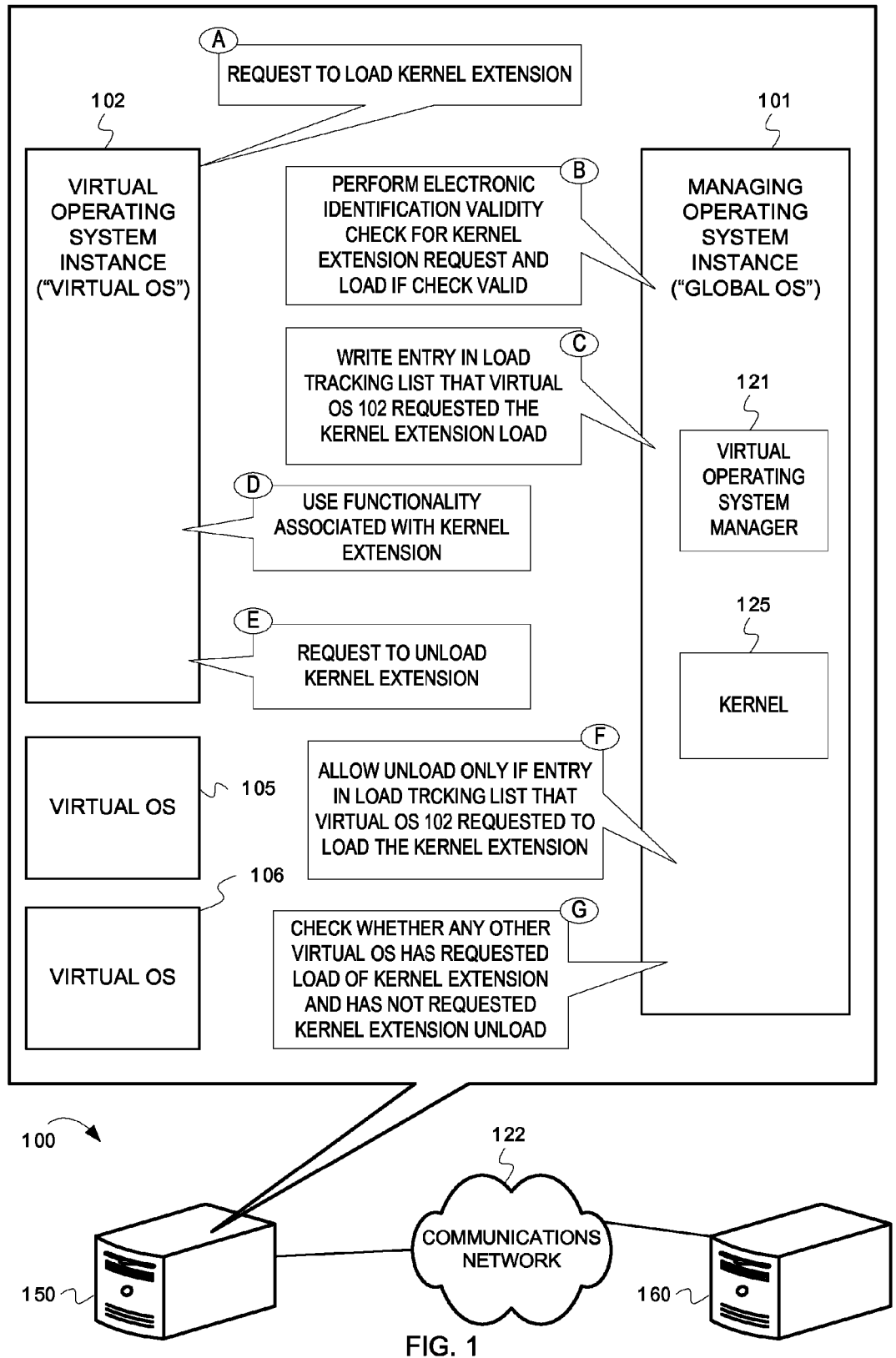
FIG. 1 is an example conceptual diagram of managing kernel extensions requested by virtual operating systems.

The description that follows includes exemplary systems, methods, techniques, instruction sequences, and computer program products that embody techniques of the present inventive subject matter. However, it is understood that the described embodiments may be practiced without these specific details. For instance, although examples refer to virtual operating systems that are managed by a global operating system, other instances may include virtual operating systems managed by hypervisors, virtual machine monitors, LPARs, other virtual operating systems, some combinations therefore, etc. In other instances, well-known instruction instances, protocols, structures, and techniques have not been shown in detail in order not to obfuscate the description.

In some embodiments, a virtual OS shares a kernel with all other virtual OS's managed on a host. A global OS can provide kernel services and system calls for all the virtual OS's running on the host. To extend the functionality of a kernel, a kernel can receive kernel modules, or kernel extensions, that are not originally programmed into, or provided with, a default, or "base" kernel. A kernel extension is an object file that contains code to extend the base kernel of an operating system. Kernel extensions may also be known as Loadable Kernel Modules (LKMs), Kernel Loadable Modules (KLM) or Kernel Modules (KMOD). Kernel extensions are typically used to add support for new hardware and/or file systems, for extending a base kernels services (e.g., device driver management), for extending device drivers, for extending file systems, for adding system calls, etc. When the functionality provided by a kernel extension is no longer required, it can be unloaded in order to free memory. Without kernel extensions, an operating system would have to have all possible anticipated functionality already compiled directly into the base kernel. Much of that functionality would reside in memory without being used, wasting memory, and would require that users rebuild and reboot the base kernel every time new functionality is desired.

To date, however, only a global OS (i.e., a root user of the global OS) has had privileges to load any kernel extensions. Virtual OS's, or rather, root users of virtual OS's (e.g., WPARs) have not had privileges to load their own kernel extensions.

One of the reasons why virtual OS's have not had privileges to load their own kernel extensions is that because multiple virtual OS's exist on one global OS, and if one virtual OS loads a kernel extension, that kernel extension could conflict with other kernel extensions loaded by, or being used by, the other virtual OS's.

For example, if one virtual OS were granted privileges to load a kernel extension, the virtual OS administrator with privileges could potentially perform other activities in the kernel space that could interfere with the global OS, thus affecting all other virtual OS's running on the global OS. Even if the administrative user for the virtual OS were only granted privileges to load and unload kernel extensions, the administrative user could potentially load non-authorized kernel extensions or unload kernel extensions that were being shared by multiple virtual OS's, thus causing tremendous problems on the global OS.

Some embodiments of the inventive subject matter provide rights to a virtual OS to dynamically load and unload kernel extensions while enacting restrictions and security mechanisms that ensure that virtual OS only loads and unloads kernel extensions that are permitted or that are non-detrimental.

FIG. 1 is an example conceptual diagram of managing kernel extensions requested for virtual operating systems. In FIG. 1, a virtual OS management system ("system") 100 includes one or more devices that are connected to each other, such as computers 150 and 160 that are connected by a communications network 122. Other embodiments, however, may include logical partitions instead of and/or in addition to, computers 150 and 160. Each of the connected devices may have one or more instances of operating systems installed on the devices. For example, computer 150 may have installed a first instance of an operating system 101. The first instance of the operating system 101 may also be referred to as a managing operating system instance, or "global OS" in some embodiments. The global OS 101 may include a virtual operating system manager 121 that manages multiple instances of virtual OS's that are installed on the devices (e.g., that are installed on one or more of the computers 150 and 160, that are installed on an LPAR, etc.). The global OS 101, for example, may manage a second instance of the operation system 102. The second instance of the operating system 102 is a virtual OS that is installed on one of the devices (e.g., on the computer 150), but that also shares resources of the device (e.g., shares resources of the computer 150 with other virtual OS's that may be running on the computer 150). The virtual operating system manager 121 is a module that can manage communications, activities, etc. for shared resources of the virtual OS's. For example, the virtual operating system manager 121 can control and manage use of a kernel 125 shared between multiple instances of operating systems (e.g., shared between the global OS 101, the virtual OS 102, and other virtual OS's 105 and 106 running on the computer 150).

In some embodiments, the virtual OS 102 has privileges to load kernel extensions to the kernel 125. At stage "A," for example, the virtual OS 102 requests to load a kernel extension (e.g., a kernel extension object file). The global OS 101 receives the request and, at stage "B," and the virtual operating system manager 121 can perform an electronic identification validity check for the kernel extension request made by the virtual OS 102. The virtual operating system manager 121 can, also at stage "B," determine that if the electronic identification validity check passes, or provides a valid or expected result. Then the virtual operating system manager 121 can permit the virtual OS 102 to continue loading the kernel extension, which may include providing the kernel extension file to one or more components of the kernel 125 to load the kernel extension into kernel memory. At stage "C," the virtual operating system manager 121 can write an entry into a list (a "kernel extension load tracking list" or more succinctly, a "load tracking list"). The entry in the load tracking list indicates that the virtual OS 102 requested to load the kernel extension. At stage "D," the virtual OS 102 uses the functionality associated with the kernel extension, such as via one or more processes that request the extended services of the kernel 125 and/or that make system calls associated with the extended services of the kernel 125. At stage "E," when the virtual OS 102 has completed use of the kernel extension, the virtual OS 102 may request to unload the kernel extension. The virtual operating system manager 121 can receive the request by the virtual OS 102 to unload the kernel extension, and at stage "F," the virtual operating system manager 121 can check the load tracking list to ensure that the virtual OS 102 has previously requested to load the kernel extension. If the load tracking list indicates that the virtual OS 102 previously requested to load the kernel extension (e.g., if the load tracking list includes the entry written at stage "C"), the virtual operating system manager 121 will permit the virtual OS 102 to unload the kernel extension. In some embodiments, the virtual operating system manager 121 can further check, at stage "G," whether any other virtual OS (e.g., virtual OS's 105 or 106) had also requested to load the kernel extension independently of virtual OS 102, and that may still need the kernel extension. For example, virtual OS 105 may have requested to load the same kernel extension that virtual OS 102 loaded, and the virtual OS 105 may also be indicated in the load tracking list (e.g., via a separate entry in the load tracking list, via a counting mechanism in the load tracking list, etc). The kernel extension, therefore, may be a shared kernel extension between virtual OS 102 and virtual OS 105. As a result, if virtual OS 102 is done using the kernel extension and wants to unload it, if virtual OS 105 has not requested to unload the same kernel extension, and therefore stills needs to request services associated with the kernel extension, then the virtual operating system manager 121 can prevent the virtual OS 102 from unloading the kernel extension even if the load tracking list indicates that the virtual OS 102 had previously requested to load the kernel extension. Thus, the virtual operating system manager 121 can perform multiple checks and provide validation measures to ensure that kernel extensions are securely and properly managed on the system 100.

Figure 2:
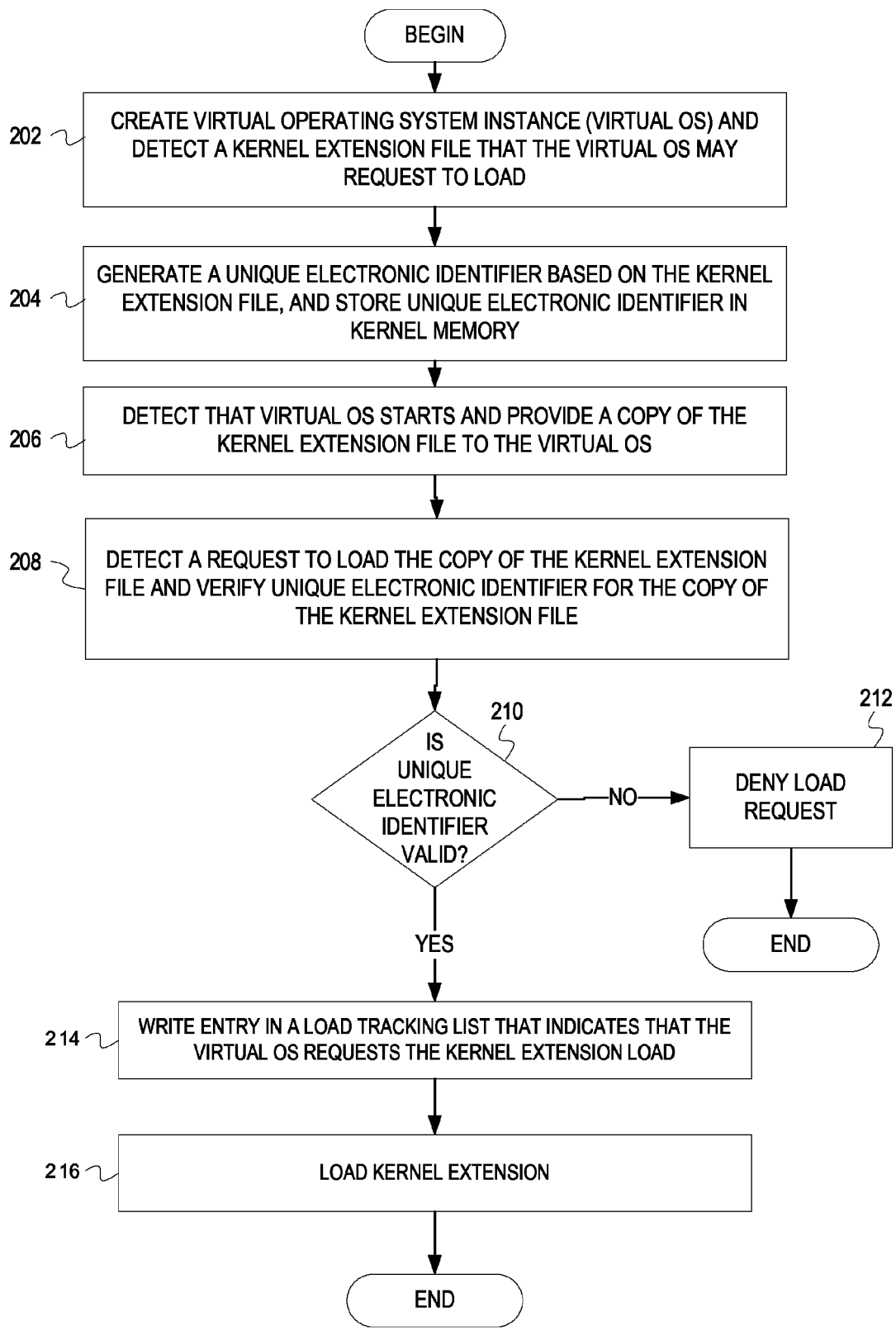
FIG. 2 is a flowchart depicting example operations for securely loading a kernel extension for a virtual operating system.

FIG. 2 is a flowchart depicting example operations for securely loading a kernel extension for a virtual operating system. For exemplary purposes, operations associated with the blocks in FIG. 2 will be described as being performed by a virtual OS management system ("system"), which may, for example, include any or all of the elements described in FIG. 1 and/or FIG. 6. FIG. 2 illustrates a flow that the system can perform.

Referring to FIG. 2, the system creates a virtual operating system instance (a virtual OS) and detects a kernel extension file that the virtual OS may request to load at some future point (202). The system can indicate a file name of the kernel extension in a first list (i.e., a potential kernel extension list) that specifies all kernel extensions that the virtual OS may want to subsequently load. The system can detect the kernel extension file by scanning and/or analyzing the virtual OS, when the virtual OS is created, to find any applications that may need the kernel extension if the virtual OS were to load and use the application at some future time. Because the system knows, or expects, that the virtual OS may subsequently need the kernel extensions, the system can also provide limited rights to a virtual OS user to subsequently load only the kernel extension.

Further, the system generates a unique electronic identifier based on the kernel extension file, and stores the unique electronic identifier in kernel memory (204). The unique electronic identifier is a set of attributes that identify the kernel extension file uniquely. The system can generate the unique identifier in different ways. For example, the system can generate the unique electronic identifier via an electronic fingerprint algorithm/function, via a cryptographic hash function, via a checksum, via a digital signature procedure, via a randomization function, etc. Some embodiments may refer to the unique electronic identifier as a fingerprint, an electronic signature, a hash value, etc. The system stores the unique electronic identifier in the protected memory of the kernel, such as in a second list, (e.g., a load tracking list), or in some other list, data structure, memory location, file, folder, table, array, database, etc. that is not accessible to the virtual OS. In some embodiments, the unique electronic identifier is a hash value, or key, that is generated by performing a hash function on the kernel extension file using a cryptographic hash algorithm (e.g., MD5, SHA-1, etc.). The system can store the hash value to compare at a future point, such as when the virtual OS requests to load the kernel extension file. The hash value identifies a configuration of the content in the kernel extension file. If the configuration of the content of the file were to be modified even slightly, and if another hash function procedure were to be performed on the modified kernel extension file, using the same hash algorithm as before, resulting in an additional hash value, then the additional hash value would be different from the original, or key, hash value.

Further, the system detects that the virtual OS starts, and then the system provides a copy of the kernel extension file to the virtual OS (206). A virtual OS user, for example, can start the virtual OS. The copy of the kernel extension file is an exact copy of the kernel extension file for which the system generated the unique electronic identifier (e.g., a copy of the kernel extension file on which the system performed a hash function). In some embodiments, because multiple virtual OS can be managed by the system (e.g., one global OS can manage multiple virtual OS's) the system can provide a copy to each virtual OS that may need a copy of the kernel extension file. The virtual OS that receives the copy of the kernel extension file can store the copy on memory allocated to the virtual OS. In some embodiments, the global OS can store the copy on protected memory allocated to the virtual OS that only an administrator of the virtual OS can access when loading the kernel extension. The virtual OS keeps its copy of the kernel extension file shielded from any other virtual OS. In some embodiments, as an added security measure, the system can encrypt the copy of the kernel extension file (e.g., the global OS and/or the virtual OS can encrypt the copy when sent and/or when received) to prevent tampering. In some embodiments, a global OS and a virtual OS can share keys to decrypt versions of the file.

The system detects a request to load the copy of the kernel extension file, and verifies the unique electronic identifier for the copy of the kernel extension file (208). A virtual OS user can request to load the copy of the kernel extension file and can provide the copy of the kernel extension file to check and load. The system can check the user's rights to determine that the user had received the rights to request the load. The system can also check that a file name for the copy of kernel extension file name is listed in a first list (i.e., in the potential kernel extension list) as a check that the system had previously verified that the virtual OS may potentially need the kernel extension. The system can verify the unique electronic identifier for the copy of the kernel extension file by, for example, re-computing a second hash value using the same hash function that was used compute the first hash value that was generated before providing the copy of the kernel extension file to the virtual OS. The system can then compare the second hash value to the first hash value that was stored in kernel memory. If both hash values match, then the copy of the kernel extension file provided by the virtual OS is equivalent to the kernel extension file on which the first hash function was performed.

In some embodiments, the virtual OS may not be the thing that requests to load the copy of the kernel extension file. In some embodiments, a global OS may instead need to load a kernel extension. For example, a global OS may receive a request from the virtual OS to perform an activity associated with the kernel (e.g., request access to a storage device). The global OS may need to provide a kernel extension that the virtual OS did not specifically request but that is required for the activity to perform properly. For example, the global OS may need to provide a device driver to the virtual OS for the storage device. As a result, the global OS, instead of requiring the virtual OS to request the kernel extension for the device driver, the global OS can just provide the device driver(s) to the virtual OS without the virtual OS needing to go through a validation process (e.g., without having to validate a unique electronic identifier).

The system verifies that the unique electronic identifier is valid (210). The system can verify that the unique electronic identifier is authorized, secure, or expected. For example, the system determines that the first hash value and the second hash value, described in the paragraph above, are equal in value. If the first hash value and the second hash value are equal in value, then the system can ensure that the copy of the kernel extension file had not been modified after it was provided to the virtual OS.

If, the system determines that the unique electronic identifier is not valid, the system can deny the virtual OS's request to load the kernel extension (212). If, however, the system determines that the unique electronic identifier is valid, the system can write an entry in a load tracking list that indicates that the virtual OS requests the kernel extension to load (214). In some embodiments, the load tracking list is stored in the kernel space. The load tracking list can track a virtual OS identifier (e.g., a WPAR ID), a name of the kernel extension file, a mode (e.g., global versus local), a unique electronic identifier (e.g., a hash), a global load count (see FIG. 3 below), a kernel memory identifier for a loaded kernel extension, etc. The load tracking list can be separate from the list referred to above for 202.

The system can further load the kernel extension (216). When the system loads the kernel extension, the system performs operations that extend functionality of the kernel by providing additional code that the kernel did not previously have and that the kernel did not have loaded into kernel memory. The system makes the functionality accessible to the virtual OS. When the system loads the kernel extension, the system can provide the virtual OS with a kernel memory identifier for the loaded kernel extension. The virtual OS can use the kernel memory identifier to request services associated with the kernel extension and/or to request to unload the kernel extension without having to refer to the kernel extension by file name. In some embodiments, as indicated previously, the global OS can manage multiple virtual OS's. The multiple virtual OS's can share the extended kernel extension functionality. In other embodiments, however, the global OS may only allow one virtual OS to access the extended functionality and not any other virtual OS. In some embodiments, each of the virtual OS's may request to load the kernel extension as a local kernel extension, even if the kernel extension could be shared. Thus, in some embodiments, the system can have multiple, but isolated, versions of the same kernel extension loaded in kernel memory. Further, in some embodiments, multiple global OS's may be installed on one machine. For example, an LPAR can have a global, or managing, OS that may manage multiple virtual OS's on the LPAR. One machine may have multiple LPARs each with separate kernels. Thus, several copies of a kernel extension may be loaded in each of the kernels on each of the LPARs.

Figure 3:
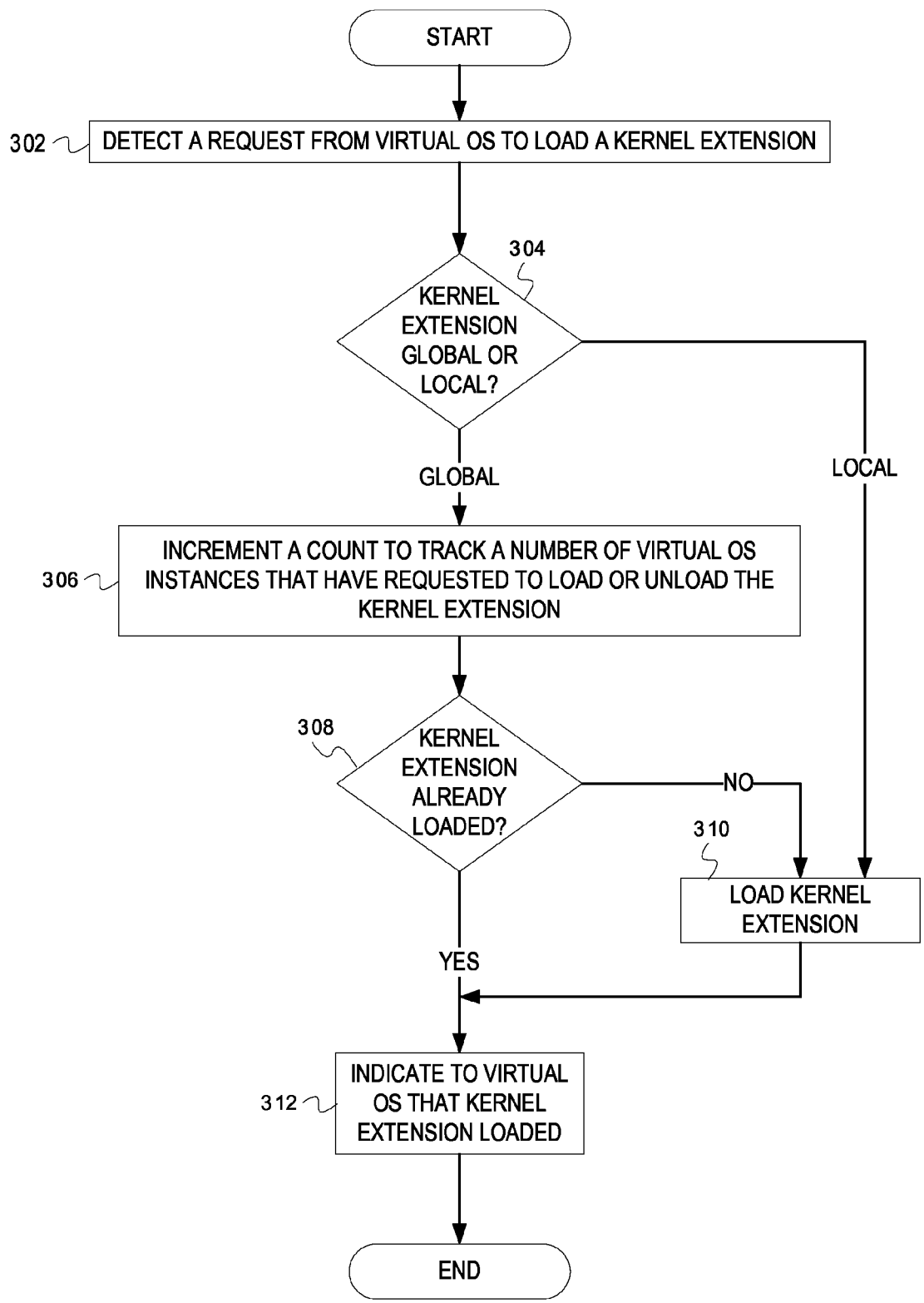
FIG. 3 is a flowchart depicting example operations for securely loading a kernel extension for a virtual operating system.

FIG. 3 is a flowchart depicting example operations for securely loading a kernel extension for a virtual operating system. For exemplary purposes, operations associated with the blocks in FIG. 3 will be described as being performed by a virtual OS management system ("system"), which may, for example, include any or all of the elements described in FIG. 1 and/or FIG. 6. FIG. 3 illustrates a flow that the system can perform. In some embodiments, the flow can continue from FIG. 2 to FIG. 3, or can be performed in parallel with the flow of FIG. 2. In other embodiments, however, some or all of the flow of FIG. 3 may be performed separately and independently from the flow of FIG. 2.

Referring to FIG. 3, the system detects a request from the virtual OS to load a kernel extension (302).

The system determines whether the kernel extension is global or local (304). A global kernel extension is a kernel extension that can be shared by more than one virtual OS. For example, a kernel extension may include a device driver for hardware that multiple virtual OS's may need access. A local kernel extension is a kernel extension that will be specific to, or used only by, the virtual OS. A virtual OS can request that the kernel extension be global (shared) or local (non-shared), depending on the virtual OS's needs and/or the needs of other virtual OS's, as determined by the system. If the system determines that the kernel extension is local, the system can load the kernel extension (310) directly. The kernel extension will be specific only to the virtual OS and will not be shared with other virtual OS's. If, however, the system determines that the kernel extension should be loaded globally, the system increments a count that tracks a number of virtual OS instances that have requested to load and/or unload the same kernel extension (306). The count can be associated with value or a variable stored in the load tracking list or in some other location in kernel memory.

The system can further determine whether the kernel extension requested by the virtual OS is already loaded in the kernel (308). If the system determines that the kernel extension is not already loaded, the system will load the kernel extension (310) as a shared kernel extension. If, however, the system determines that the kernel extension is already loaded, the system indicates to the virtual OS that the kernel extension is loaded (312). In some embodiments, the system can indicate to the virtual OS that the kernel extension is loaded in a way that convinces the virtual OS that it loaded the kernel extension even if the virtual OS did not load the kernel extension.

Further, the flow of FIG. 3 can also be used to request loading of any kernel service or specific services, and not just for loading entire kernel extensions. Further, some embodiments can track a count in other ways, such as decrementing a count when a virtual OS requests to load a kernel extension and incrementing the count when the virtual OS requests to unload the kernel extension. Other embodiments may track requests for loading and unloading of a global kernel extension by modifying symbols or values of types other than numbers, such as text values or tally mark indicators. For example, in some embodiments, the system may write, into a file, textual names or other unique identifiers of all virtual OS's that request a global kernel extension. When a virtual OS requests to remove a global kernel extension, the system can remove the name or identifier for the virtual OS. To determine whether a virtual OS still requires use or access to the global kernel extension, the system can check the file to determine whether any text remains in the list or whether specific text remains in the list. For example, in some embodiments, after a first virtual OS requests to load a kernel extension globally, the system can the write a name or identifier for the first virtual OS ("virtual OS identifier") into a list (e.g., a load tracking list). The system can also specify a first instance of a name or identifier for the global kernel extension ("kernel extension identifier") and associate the virtual OS identifier with the kernel extension identifier to indicate that the first virtual OS has loaded the kernel extension. When one or more other virtual OS's (e.g., a second virtual OS) also requests to load the same kernel extension globally, the system can write other entries in the list for the one or more other virtual OS's that include additional instances of the kernel extension identifier. When the first virtual OS requests to unload the specific kernel extension, the system can remove from the list the first instance of the kernel extension identifier associated with the first virtual OS. To determine whether any of the one or more other virtual OS's still require use or access to the kernel extension, the system can search the list and determine whether any entries indicate the other instances of the kernel extension identifier associated with any of the one or more other virtual OS's. In some embodiments, the kernel extension identifier may be a unique kernel extension identifier, such as an address in kernel memory where the kernel extension is loaded, and the system can verify whether any other entries in the list, for any other virtual OS, also include the unique kernel extension identifier. In some embodiments, the system can also set a type indicator in the list (e.g., set the type indicator to "global" versus "local") to indicate whether the kernel extension is loaded globally or locally for any given virtual OS.

Figure 4:
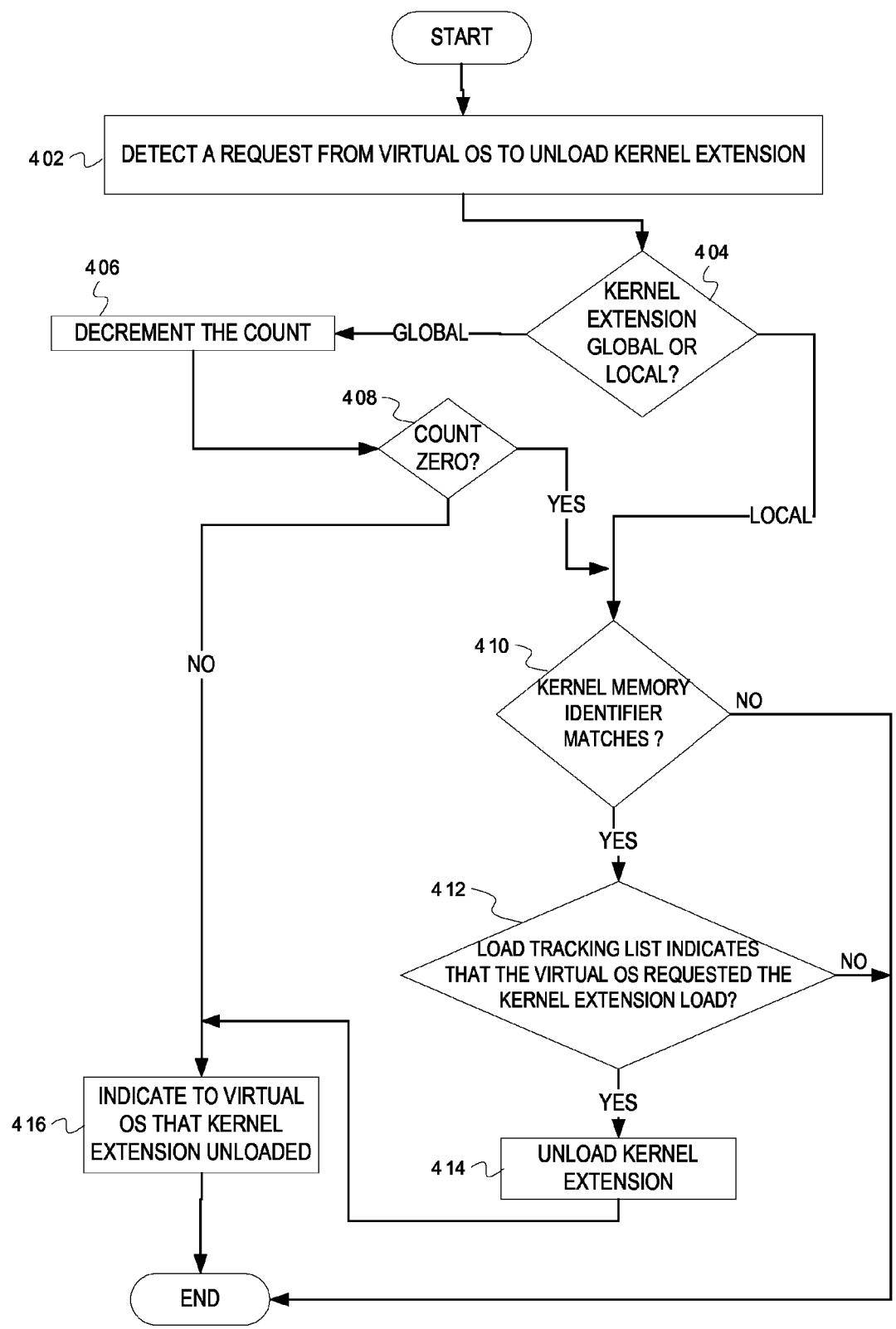
FIG. 4 is a flowchart depicting example operations for securely unloading a kernel extension for a virtual operating system.

FIG. 4 is a flowchart depicting example operations for securely unloading a kernel extension for a virtual operating system. For exemplary purposes, operations associated with the blocks in FIG. 4 will be described as being performed by a virtual OS management system ("system"), which may, for example, include any or all of the elements described in FIG. 1 and/or FIG. 6. FIG. 4 illustrates a flow that the system can perform. In some embodiments, the flow can continue from FIG. 2 or 3 to FIG. 4. In other embodiments, however, some or all of the flow of FIG. 4 may be performed separately and independently from the flows of FIG. 2 or 3.

Referring to FIG. 4, the system detects a request from a virtual OS to unload a kernel extension (402).

The system can determine whether the kernel extension is global or local (404). The system can determine whether the kernel extension is global or local similarly as described for 304 in the flow of FIG. 3 above. If the system determines that the kernel extension is global, the system can decrement a count (406) that was previously incremented (e.g., see 306 of FIG. 3). If the count is zero (408), or some other expected value that indicates no other virtual OS needs the global kernel extension, the system can determine whether a memory identifier provided by the virtual OS matches (410) an entry in the load tracking list for the kernel extension. For example, in some embodiments, when the virtual OS previously requested to load the kernel extension, the system may have provided a kernel memory identifier and may have stored the kernel memory identifier in the load tracking list. If the system determines that the kernel memory identifier matches, the system determines whether the load tracking list indicates that the virtual OS had previously requested the kernel extension to load (412). For example, in FIG. 2 at 214, the system previously indicated that the virtual OS had requested to load the kernel extension and made an indication in the load tracking list. Referring back to FIG. 4, if the system determines that the load tracking list indicates that the virtual OS had previously requested to kernel extension to load, and then the system can unload the kernel extension (414) and indicate to the virtual OS that the kernel extension is unloaded. If, the system, however, determines that the kernel memory identifier does not match (at 410) or that the load tracking list does not indicate that the virtual OS had previously requested to load the kernel extension (at 412), then the system can deny, or refrain from, unloading the kernel extension.

Further, if, at 408, the system determines that the global count is not at zero, or some other expected value. In other words, if the global count indicates that another virtual OS may still need to keep the kernel extension loaded, the system can indicate to the virtual OS that the kernel extension is unloaded even though the system does not unload the kernel extension. The system, therefore, can provide to the virtual OS a message, or other an indication, that the kernel extension is unloaded so that the virtual OS can perform any clean-up procedures when closing an application or terminating one or more processes that were utilizing the kernel extension and that expect the kernel extension to be unloaded before completing the clean-up process.

FIG. 4 thus shows three potential security checks that the system can perform (i.e., checking the count (408), checking the kernel memory identifier (410) and checking the load tracking list (412)) before unloading a kernel extension to prevent kernel extension conflicts, errors, attacks, etc.

Figure 5:
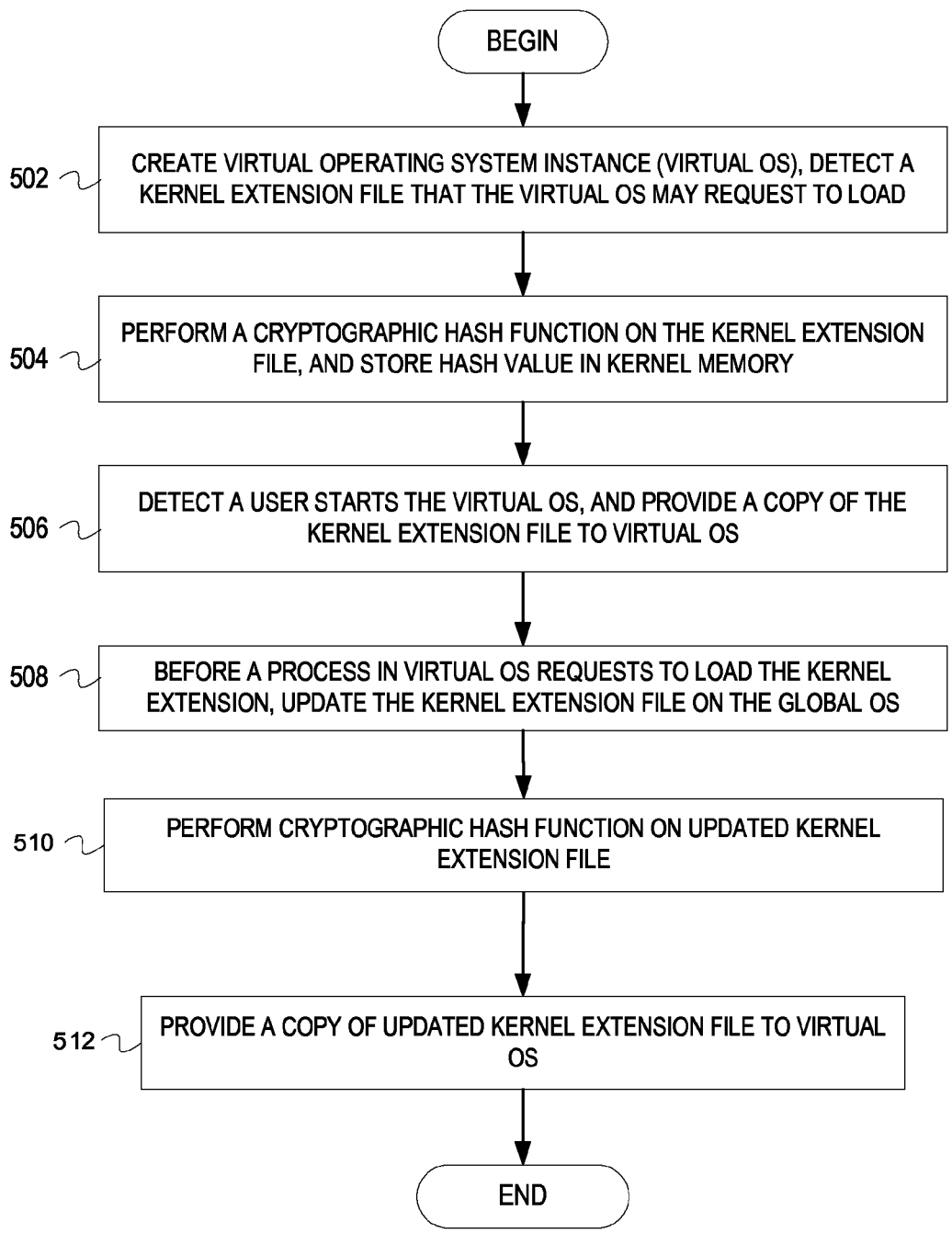
FIG. 5 is a flowchart depicting example operations for updating kernel extension files for a virtual operating system.

FIG. 5 is a flowchart depicting example operations for updating kernel extension files for a virtual operating system. For exemplary purposes, operations associated with the blocks in FIG. 5 will be described as being performed by a virtual OS management system ("system"), which may, for example, include any or all of the elements described in FIG. 1 and/or FIG. 6.

Referring to FIG. 5, the system creates a virtual OS and detects a kernel extension file that the virtual OS may request to load (502) similarly as described above in FIG. 2.

The system can perform a cryptographic hash function on the kernel extension file and store the hash value in kernel memory (504). Then, system can detect that an administrative user of the virtual OS starts the virtual OS and the system can then provide a copy of the kernel extension file to the virtual OS.

Before the virtual OS requests to load the first copy of the kernel extension file, the system may update one or more files from the base kernel (506) including the kernel extension file on which the cryptographic hash function was performed at 504. The system must thereafter provide a copy of the updated kernel extension to the virtual OS. However, before providing the copy of the updated kernel extension file, the system performs the cryptographic hash function on the updated kernel extension file (510) generating a new hash value. The system can store the new hash value in the kernel memory and use it a later time to validate the kernel extension when loaded by the virtual OS. The system can then provide a copy of the updated kernel extension file to the virtual OS (512), which the virtual OS can use subsequently request to load.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
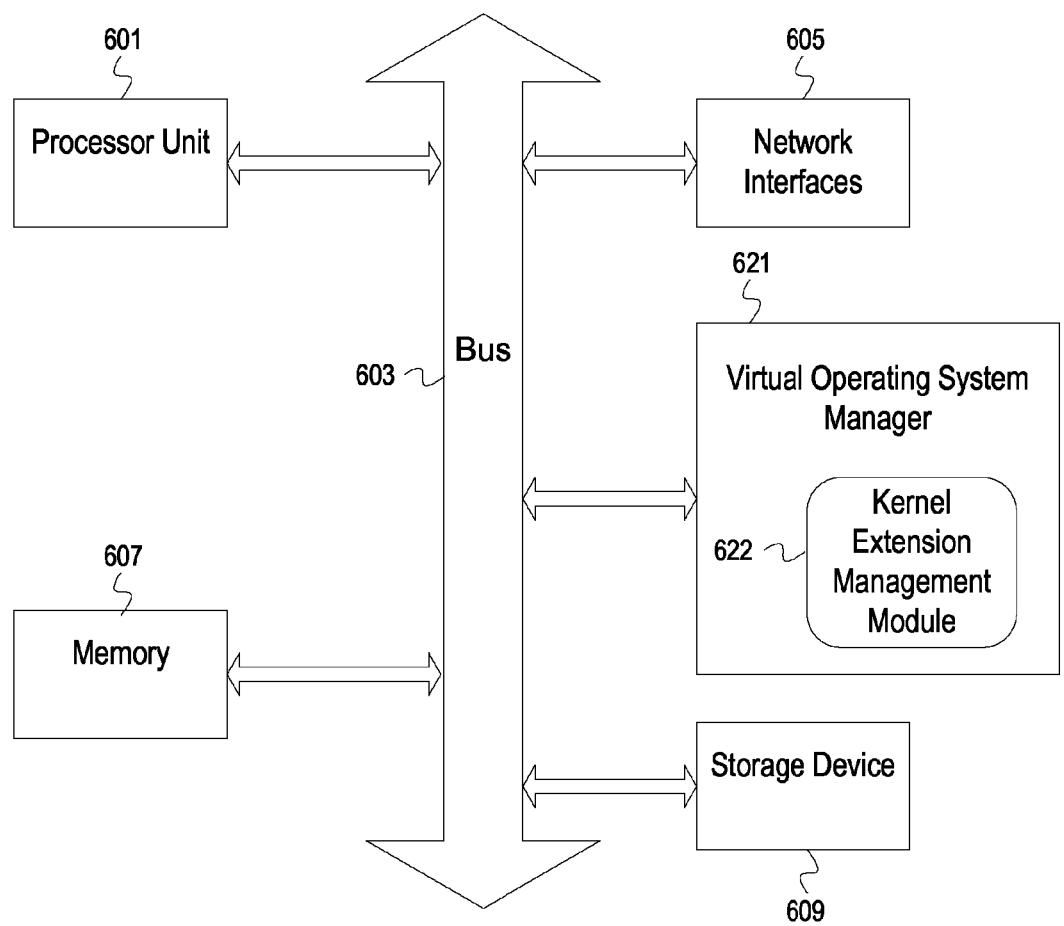
FIG. 6 depicts an example computer system.

FIG. 6 depicts an example computer system 600. The computer system 600 includes a processor unit 601 (possibly including multiple processors, multiple cores, multiple nodes, and/or implementing multi-threading, etc.). The computer system 600 includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable or computer readable media. The computer system 600 also includes a bus 603 (e.g., PCI bus, ISA, PCI-Express bus, HyperTransport® bus, InfiniBand® bus, NuBus bus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system 600 also includes a virtual operating system manager 621. The virtual operating system manager 621 can manage resources of the computer system 600 that are shared between one or more instances of operating systems (i.e., virtual operating systems) that may run on, or that are controlled by, the computer system 600. The virtual operating system manager 621 can include individual components or parts that manage different aspects or parts of the virtual operating system and shared resources. For example, the virtual operating system manager 621 can include a kernel extension management module 622 that can securely manage loading and unloading of kernel extensions/modules by virtual operating systems.

Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for debugging workflows as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a file that a first of a plurality of instances of an operating system is configured to load, wherein a kernel and the plurality of instances of the operating system are managed by a second of the plurality of instances of the operating system, wherein the plurality of the instances of the operating system share the kernel, and wherein the file is configured to extend functionality of the kernel when loaded;
    generating a unique electronic identifier based on properties of the file, wherein the unique electronic identifier uniquely identifies the file; providing a copy of the file to the first of the plurality of instances of the operating system;
    receiving a request from the first of the plurality of the instances of the operating system to load the copy of the file;
    determining, using the unique electronic identifier, that the copy of the file from the first of the plurality of the instances of the operating system is equivalent to the file;
    determining whether the file is to be loaded locally or globally;
    in response to determining that the file is to be loaded locally:
        loading the copy of the file directly using the unique electronic identifier, wherein loading the file locally allows the file to be specific to the first of the plurality of the instances of the operating system; and
    in response to determining that the file is to be loaded globally:
        incrementing a counter, wherein the counter tracks a number of the plurality of the instances of the operating system that have requested to load the file; and
        loading the copy of the file using the unique electronic identifier, wherein loading the file globally allows the file to be sharable by the plurality of the instances of the operating system.

2. The method of claim 1, wherein said generating the unique electronic identifier based on properties of the file comprises performing a first cryptographic hash procedure on the file using a cryptographic hash function, said first cryptographic hash procedure generating a first hash value, and wherein said determining, using the unique electronic identifier, that the copy of the file from the first of the plurality of the instances of the operating system is equivalent to the file comprises:
    performing a second cryptographic hash procedure via the cryptographic hash function on the copy of the file, said second cryptographic hash procedure generating a second hash value;
    comparing the first hash value and the second hash value; and
    determining, based on the comparing, that the first hash value and the second hash value are equivalent.

3. The method of claim 1, wherein said generating the unique electronic identifier based on properties of the file comprises performing a first fingerprint function on the file generating a first fingerprint value, and wherein said determining, using the unique electronic identifier, that the copy of the file from the first of the plurality of the instances of the operating system is equivalent to the file comprises:
    performing a second fingerprint function on the file generating a second fingerprint value;
    comparing the first fingerprint value and the second fingerprint value; and
    determining, based on the comparing, that the first fingerprint value and the second fingerprint value are equivalent.

4. The method of claim 1, further comprising:
    updating the file before receiving the request from the first of the plurality of the instances of the operating system to load the copy of the file;
    generating, after the updating, an additional unique electronic identifier based on properties of the file that was updated;
    providing an additional copy of the file that was updated to the first of the plurality of the instances of the operating system after the generating the additional unique electronic identifier; and
    replacing the unique electronic identifier with the additional unique electronic identifier.

5. The method of claim 1, wherein said first of the plurality of the instances of the operating system is installed on a software partition and the second of the plurality of the instances of the operating system is installed on one or more of a logical partition and a server.

6. The method of claim 1, wherein providing the copy of the file to the first of the plurality of instances of the operating system comprises:
    storing the copy of the file in memory allocated for the first of the plurality of instances of the operating system.

7. The method of claim 1, further comprising:
    encrypting the copy of the file before providing the copy of the file to the first of the plurality of instances of the operating system; and decrypting the copy of the file after receiving the request from the first of the plurality of the instances of the operating system to load the copy of the file.

8. The method of claim 1, wherein receiving the request from the first of the plurality of the instances of the operating system to load the copy of the file comprises:
receiving the copy of the file from the first of the plurality of the instances of the operating system.

9. A computer program product for managing kernel extensions for one or more virtual operating systems, the computer program product comprising:
a computer readable storage medium having computer readable program code embodied therewith, the computer readable program code comprising:
computer readable program code configured to, scan one or more of a plurality of instances of an operating system to detect a file that a first of the plurality of instances of the operating system is configured to load, wherein a kernel and the plurality of instances of the operating system are managed by a second of the plurality of the instances of the operating system, wherein the plurality of the instances of the operating system share the kernel, wherein the file is configured to extend functionality of the kernel when loaded, wherein the scan is performed to determine applications referencing the kernel extension, and wherein the scan is performed prior to receiving a request to load the file;
generate a unique electronic identifier based on properties of the file, wherein the unique electronic identifier uniquely identifies the file;
provide a copy of the file to the first of the plurality of instances of the operating system;
receive a request from the first of the plurality of the instances of the operating system to load the copy of the file;
determine, using the unique electronic identifier that the copy of the file from the first of the plurality of the instances of the operating system is equivalent to the file;
determine whether the file is to be loaded locally or globally;
in response to a determination that the file is to be loaded locally:
load the copy of the file directly using the unique electronic identifier, wherein loading the file locally allows the file to be specific to the first of the plurality of the instances of the operating system; and
in response to a determination that the file is to be loaded globally:
increment a counter, wherein the counter tracks a number of the plurality of the instances of the operating system that have requested to load the file; and
load the copy of the file using the unique electronic identifier, wherein loading the file globally allows the file to be sharable by the plurality of the instances of the operating system.

10. The computer program product of claim 9, said computer readable program code being configured to generate the unique electronic identifier based on properties of the file being configured to
perform a cryptographic hash procedure on the file using a cryptographic hash function, said cryptographic hash procedure generating a key hash value, and
use the key hash value to determine that the copy of the file from the first of the plurality of the instances of the operating system is equivalent to the file.

11. The computer program product of claim 10, said computer readable program code being configured to use the key hash value to determine that the copy of the file from the first of the plurality of the instances of the operating system is equivalent to the file being configured to,
perform an additional cryptographic hash procedure via the cryptographic hash function on the copy of the file after receiving the request from the first of the plurality of the instances of the operating system to load the copy of the file, said additional cryptographic hash procedure generating an additional hash value,
comparing the key hash value and the additional hash value, and
determining, based on the comparing the key hash value and the additional hash value, that the key hash value and the additional hash value are equivalent.

12. The computer program product of claim 9, wherein the first of the plurality of instances of the operating system is installed on a first software partition, wherein a third of the plurality of instances of the operating system is installed on a second software partition, and wherein the second of the plurality of instances of the operating system is installed on one or more of a logical partition and a computer.

13. The computer program product of claim 9, said computer readable program code being further configured to,
extend the functionality of the kernel exclusively for the first of the plurality of instances of the operating system.

14. The computer program product of claim 9, wherein the unique electronic identifier is generated using one or more of a checksum and a randomization function.

15. An apparatus comprising:
a processing unit;
a network interface; and
a virtual operating system manager operable to, via the processing unit:
detect a file that a first of a plurality of instances of an operating system is configured to load, wherein a kernel and the plurality of instances of the operating system are managed by a second of the plurality of the instances of the operating system, wherein the plurality of the instances of the operating system share the kernel, and wherein the file is configured to extend functionality of the kernel when loaded;
perform a hash function procedure on one or more unique properties of the file using a hash algorithm;
generate a hash value via the hash function procedure, wherein the hash value uniquely identifies the one or more unique properties of the file, store the hash value in memory accessible only to the second of the plurality of the instances of the operating system;
provide a copy of the file to the first of the plurality of instances of the operating system after generating the hash value;
receive a request from the first of the plurality of the instances of the operating system to load the copy of the file, access the hash value;
determine whether the file is to be loaded locally or globally;
in response to a determination that the file is to be loaded locally:
load the copy of the file directly using the unique electronic identifier, wherein loading the file locally allows the file to be specific to the first of the plurality of the instances of the operating system; and in response to a determination that the file is to be loaded globally:
  increment a counter, wherein the counter tracks a number of the plurality of the instances of the operating system that have requested to load the file; and
  load the copy of the file using the unique electronic identifier, wherein loading the file globally allows the file to be sharable by the plurality of the instances of the operating system and
  use the hash value to verify that the copy of the file possesses the one or more unique properties of the file.

16. The apparatus of claim 15, wherein the virtual operating system manager is operable to use the hash value to verify that the copy of the file possesses the one or more unique properties of the file being further operable to
  generate an additional hash value via the hash function on the one or more unique properties of the copy of the file after receiving the request from the first of the plurality of the instances of the operating system to load the copy of the file, compare the hash value and the additional hash value, and determine that the hash value and the additional hash value are the same.

17. The apparatus of claim 15, wherein the virtual operating system manager is further operable to
  load the copy of the file in response to using the hash value to verify that the copy of the file possesses the one or more unique properties of the file, wherein loading the copy of the file extends the functionality of the kernel.

18. The apparatus of claim 15, wherein the first of the plurality of instances of the operating system is installed on a software partition and wherein the second of the plurality of instances of the operating system is installed on one or more of a logical partition and a computer.

19. The apparatus of claim 15, wherein the hash algorithm is a cryptographic hash algorithm.

20. The apparatus of claim 15, wherein the virtual operating system manager is further operable to
  receive the copy of the file from the first of the plurality of instances of the as part of the request from the first of the plurality of the instances of the operating system to load the copy of the file.

* * * * *